United States Patent [19]

Cooper, Jr. et al.

[11] Patent Number: 4,653,164
[45] Date of Patent: Mar. 31, 1987

[54] SLEEVING OF TUBES OF STEAM GENERATOR IN HOSTILE ENVIRONMENT

[75] Inventors: Frank W. Cooper, Jr., Monroeville, Pa.; Bruce A. Howard, Seminole, Fla.

[73] Assignee: Westinghouse Electric Corp., Pittsburgh, Pa.

[21] Appl. No.: 580,038

[22] Filed: Feb. 14, 1984

[51] Int. Cl.[4] .............. B21D 53/00; B23P 17/00; B23P 19/00; G21C 19/00
[52] U.S. Cl. ................ 29/157.4; 29/400 N; 29/723; 376/260
[58] Field of Search .......... 138/98, 97; 29/157.4 C, 29/157.3, 402.01, 402.09, 446, 450–452, 723, 400 N, 525, 523; 376/260

[56] References Cited

U.S. PATENT DOCUMENTS

| | | | |
|---|---|---|---|
| 2,884,662 | 5/1959 | McGuire | 29/525 |
| 4,069,573 | 1/1978 | Rogers et al. | 138/98 |
| 4,173,060 | 11/1979 | Massaro et al. | 29/723 |
| 4,329,769 | 5/1982 | Glatthorn | 29/727 |
| 4,368,571 | 1/1983 | Cooper | 138/97 |
| 4,406,856 | 9/1983 | Wilkins et al. | 29/157.4 |
| 4,483,061 | 11/1984 | Trudell et al. | 29/523 |

Primary Examiner—Howard N. Goldberg
Assistant Examiner—Steven Nichols
Attorney, Agent, or Firm—H. Diamond

[57] ABSTRACT

To limit the exposure of personnel to radioactivity within the channel head of a steam generator of a nuclear-reactor plant a cartridge sleeve-blank loader for automatically sleeving a plurality of tubes without the intervention of personnel is provided. The cartridge loader includes a turret or drum which carries a plurality of sleeve blanks around its periphery. A lifter engages the bottom of each sleeve bank in its turn at a sleeve insertion position of the turret and inserts the sleeve blank into a tube. Successive sleeve blanks are indexed to the insertion position for insertion into tubes. The sleeve blanks are slightly bowed or curved so that when a sleeve blank is inserted as a sleeve into a tube, the sleeve, since the tube is linear, exerts a restoring force on the wall of a tube which holds the sleeve in the tube when the lifter is retracted. In inserting the sleeve blank, the lifter moves at a low speed until the leading end of the sleeve enters a tube. Then the speed of insertion is increased. The turret is readily removable from the sleeve loader by use of a unique handle assembly so that any empty turret can be removed in a short time. In the practice of the invention, a loaded cartridge sleeve-blank loader is loaded ready for insertion outside of the channel head. Once all the sleeve blanks on a turret are inserted, an operator enters the manway of the channel head and removes the unloaded turret. The loaded turret is handed to him and he inserts it. The replacing operation can be accomplished by exposing the operator to radiation for no more than about 75 seconds.

7 Claims, 15 Drawing Figures

SLEEVING OF TUBES OF STEAM GENERATOR IN HOSTILE ENVIRONMENT

CROSS-REFERENCE TO RELATED APPLICATIONS

This invention is an improvement over the invention disclosed in application Ser. No. 538309 filed Oct. 3, 1983 to Frank W. Cooper et al. for "Sleeving of Tubes of Steam Generator, assigned to Westinghouse Electric Corporation (herein Cooper).

BACKGROUND OF THE INVENTION

This invention relates to the nuclear-reactor art. It has particular relationship to the repair of the damaged, cracked or corroded tubes, of a steam generator of a nuclear-reactor plant. In accordance with the teachings of Cooper and other related teaching, the repair of the damaged tubes is effected by inserting sleeves in the tubes and providing metallically sealed joints between the sleeves and the sleeved tubes. To carry out this operation, an operator must enter the channel head of the generator and set the sleeves for a sleeving operation. The environment within the channel head is radioactive. Extensive studies have shown that the task which the operator must perform during sleeving insertion renders this process the most radiation-exposure-intensive operation within the overall sleeving process. In accordance with the teachings of Cooper, the sleeve blanks are inserted in the tubes one at a time. While the Cooper invention has performed highly satisfactorily, its ability to carry out only one sleeve insertion operation at a time constitutes a disadvantage. For each sleeving operation, an operator must expose himself to radioactivity by entering the channel head to position a sleeve blank and the mandrel on Cooper's sleeve inserter and otherwise to adjust or to set the sleeve inserter.

In Cooper, an expander is required to expand the inserted sleeves so that they are held in the tubes until they can be metallically sealed. The demand for an expander accentuates the requirement that the tubes be sleeved one at a time which in turn entails the repeated exposure to radioactivity of operators.

It is an object of this invention to minimize the exposure of personnel to radioactivity on the sleeving of damaged, cracked or corroded tubes of a steam generator of a nuclear-reactor plant and to provide a method for accomplishing this purpose which shall not require the expansion of the sleeves in the tubes.

SUMMARY OF THE INVENTION

The exposure to radioactivity of operators is minimized by providing a cartridge sleeve-blank loader which not only limits the exposure of personnel to radioactivity but also materially increases productivity. The cartridge sleeve-blank loader includes a main framework. A sleeve-blank turret or drum is readily positioned on, and readily removable from, the framework in a short time. The turret has a plurality of receptacles typically as many as 24 in which about 22 sleeve blanks are typically loaded. The framework also supports a sleeve-blank lifter which includes a vertically movable carriage carrying a lift bar. The carriage is driven vertically, typically by a low voltage electric motor, through a screw and ball nut. The lift bar engages the sleeve blank in a receptacle at a loading position and inserts the sleeve blank into a tube below which the lifted sleeve blank is centered. Successive receptacles, each carrying a sleeve blank, are indexed into the inserted position of the turret and inserted into corresponding tubes.

In accordance with the invention the sleeve blanks are curved while the tubes to be sleeved are linear. Once a sleeve blank is thrust into a tube it is straightened exerting restoring force on the inner wall of the tube so that it is held in the tube by friction. An expander as disclosed in Cooper is thus dispensed with.

The cartridge sleeve-blank loader is mounted on a coordinate transport similar to the one disclosed in Cooper. The loader is provided with lockpins as disclosed in Cooper which are engaged in tubes that are so located near the tube to be sleeved that a sleeve blank in the sleeving position would be centered under the tube to be sleeved. The tubes may be regarded as arrayed in rows and columns or lines. Typically, the tubes in the rows may be aligned each set directly along a column. Or the tubes in each row may be staggered with respect to the tubes in the just preceding and/or just succeeding row. The lockpins are adjustable so that the center line between the axes of the pins is parallel to the rows where the tubes are not staggered and parallel to the columns where the tubes are staggered. The coordinate transport has the facility for affording precise setting of the sleeve-blank loader as its carriage is moved from position to position for successive sleeving of tubes with the sleeves in the turret. In the practice of this invention, the turret is loaded with sleeve blanks in an assembly area outside of the radioactive channel head. An operator or attendant then enters the channel head and quickly removes an empty turret whose sleeve blanks have been inserted from a cartridge sleeve-blank loader mounted on the coordinate transport. The loaded turret is then handed to the attendant and he quickly installs the loaded turret in the cartridge loader, sets the loader for unloading the loaded turret and leaves the channel head. A handle assembly uniquely suitable for quick positioning of a turret in the sleeve-blank loader is provided.

BRIEF DESCRIPTION OF THE DRAWINGS

For a better understanding of this invention, both as to its organization and as to its method of operation, together with additional objects and advantages thereof, reference is made to the following description, taken in connection with the accompanying drawings, in which.

Figure 1:
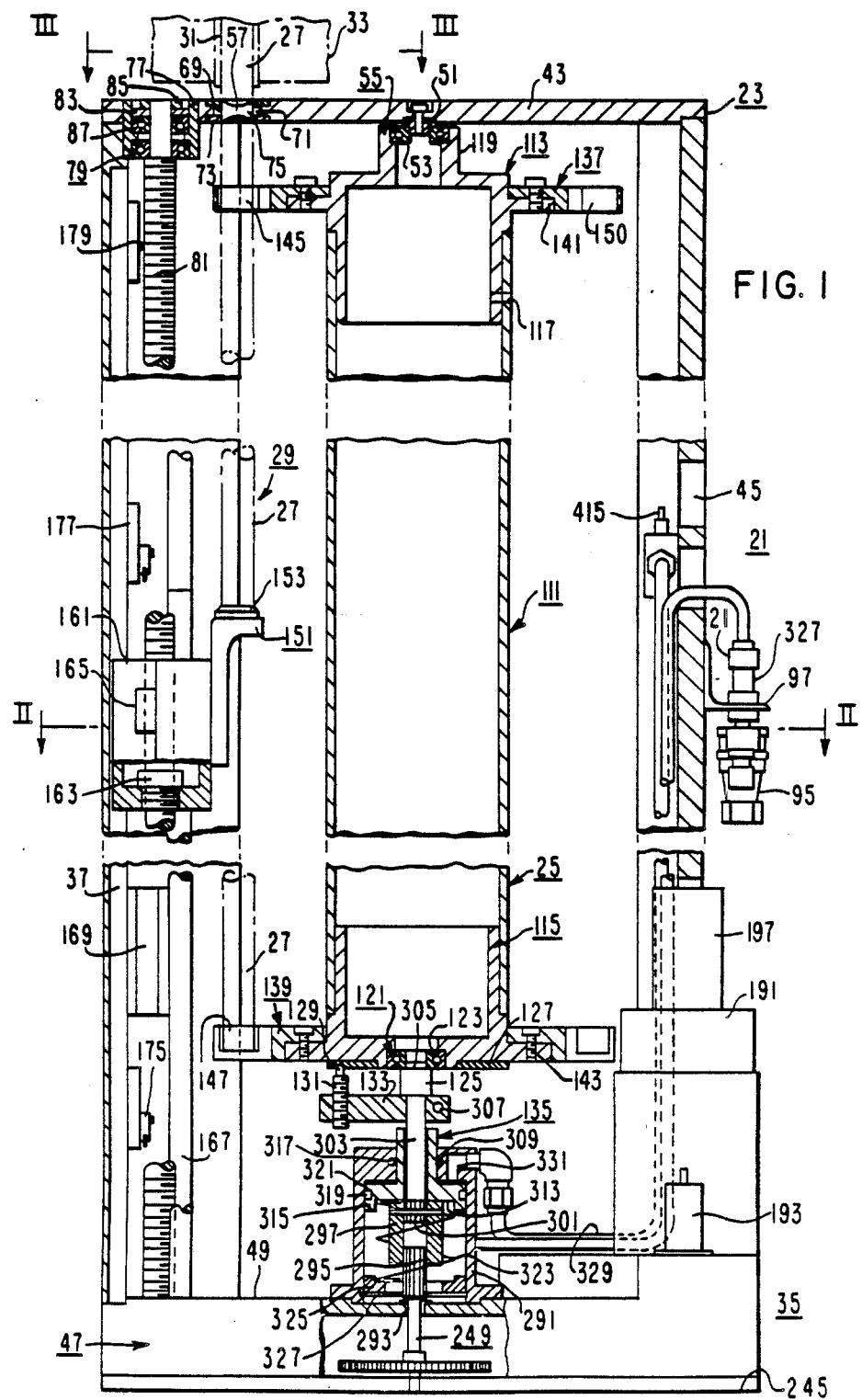
FIG. 1 is a view in longitudinal section of apparatus with which the method of this invention is practiced.
Figure 1A:
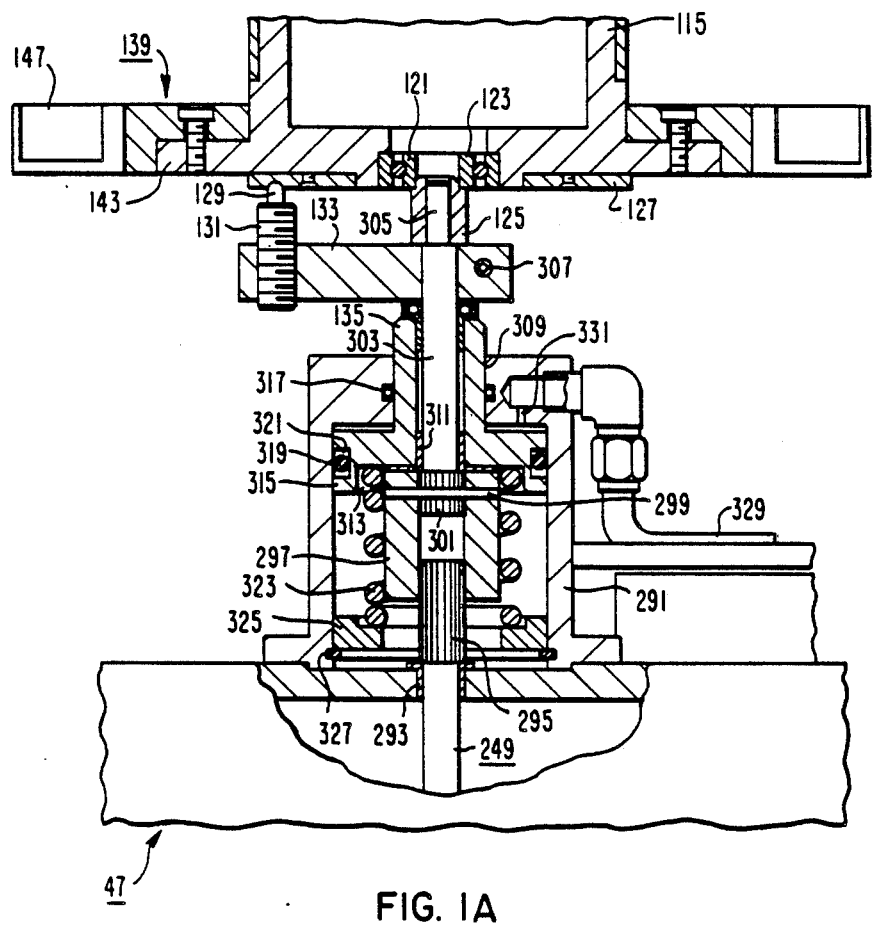
FIG. 1A is an enlargement of the lower portion of FIG. 1.

DETAILED DESCRIPTION OF APPARATUS FOR PRACTICING INVENTION AND PRACTICE OF INVENTION

The apparatus shown in the drawings is a cartridge sleeve-blank loader 21. The sleeve-blank loader includes a supporting framework 23, a readily removable and replaceable turret or drum 25 for the sleeve blanks 27, a lifter 29 for raising the sleeve blanks 27 and inserting them into cracked or corroded or otherwise damaged tubes 31 in the tube sheet 33 of a steam generator of a nuclear-reactor plant and a drive 35 for the lifter 29 and for indexing the turret 25. A part of a sleeve blank 27 is shown in broken lines in FIG. 1 in the turret on the left and a sleeve blank is also shown above in broken lines on the lifter 29 which is partly raised.

Figure 2:
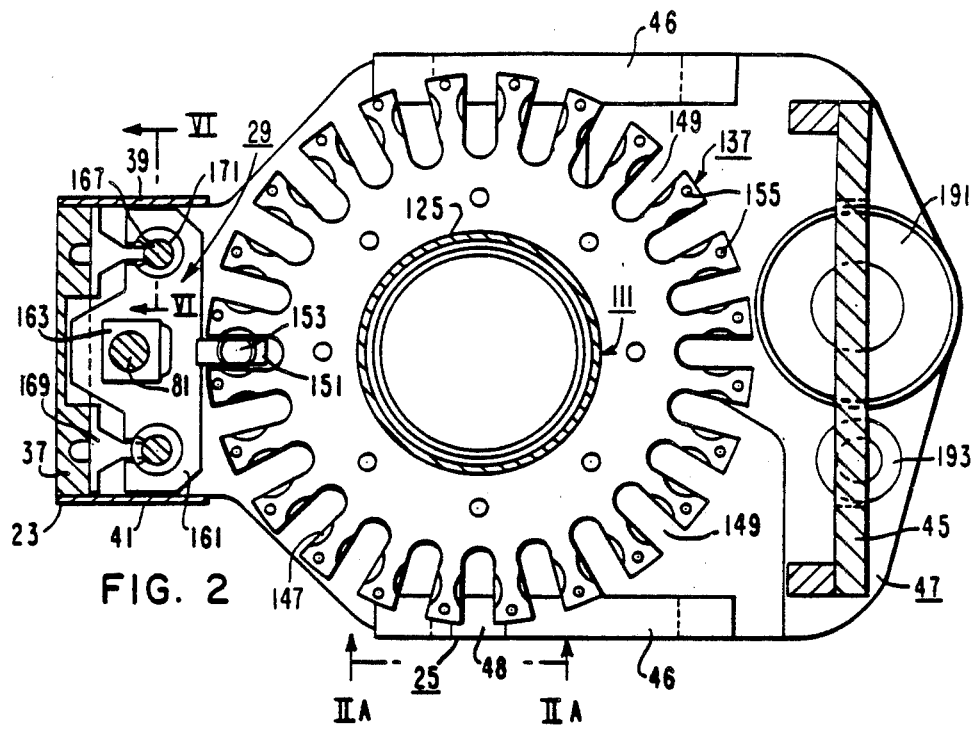
FIG. 2 is a view in transverse section taken along line II—II of FIG. 1.

The framework 23 includes a front plate 37, side plates 39 and 41 (FIG. 2), a top plate 43 and a rear plate 45. The framework 23 is seated on the gearbox assembly 47 of the drive 35. The top plate 43 is secured to the back plate 45. As shown in FIG. 2 the front plate 37 and the side plates 39 and 41 of the framework 23 form a cavity encloses the lifter 29 on three sides. The turret 25 extends rearwardly of this part of the framework from the open side to the rear plate 45. The sleeve-blank inserting position of the turret 25 is centered rearwardly of this opening in the cavity defined by plates 37, 39, 41 (FIG. 2).

At the center of the top plate 43, the upper pivot 51 (FIG. 1) for the turret 25 is secured. The pivot 51 has a shoulder which seats the inner race 53 of the upper thrust bearing 55 of the turret 25 when the turret is properly positioned in the apparatus.

Figure 3:
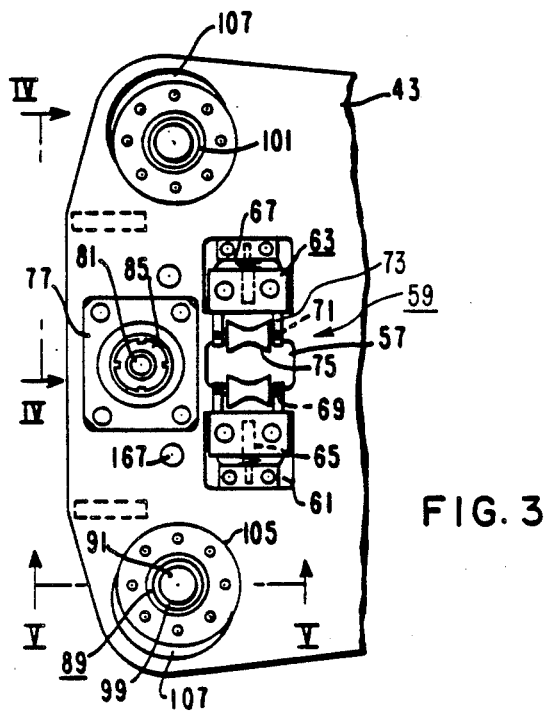
FIG. 3 is a partial plan view taken in the direction III—III of FIG. 1.
Figure 4:
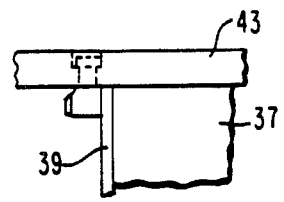
FIG. 4 is a fragmental view in side elevation taken in the direction IV—IV of FIG. 3.

The top plate 43 also has an opening 57 (FIG. 3) through which the sleeve blanks 27 are thrust by the lifter 29. Upwardly of the top plate 43, a roller guide assembly 59 for the sleeve blanks extends over the opening 57. The assembly 57 includes oppositely disposed brackets 61 secured to the top plate 43. On each bracket a clevis 63 is slidably mounted. Each clevis 63 is connected to its bracket 61 by a dowel pin 65 which permits horizontal movement of the clevis. There is a coil spring 67 about each pin 65. The coil spring 67 engages opposite surfaces of the bracket 61 and clevis 63 urging the clevis inwardly towards the opening 57. A bearing pin 69 is secured by dowel pins 71 to the arms 73 of each clevis 63. Grooved rollers 75 are rotatable on the bearings. The sleeve blank 27 as it is passed through opening 57 is firmly engaged and guided by the rollers 57 as they are urged towards each other by the springs 67.

A hollow-flanged bracket 77 (FIG. 3) extends into an opening in the top plate 43 centrally disposed with respect to the front plate 39 and 41. The bracket 77 is secured to the top plate 43. Tapered roller bearings 79 (FIG. 1) for the drive screw 81 of the lifter 29 extend into bracket 77. The bearings 79 are secured between a shoulder on the screw 81 and a lock washer 83 held by a bearing screw 85 against the rotating race 87 of the upper bearing.

Figure 5:
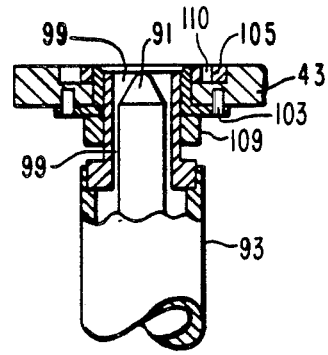
FIG. 5 is a fragmental view in longitudinal section taken in the direction V—V of FIG. 3.

Lockpin assemblies 89 (FIG. 3) are suspended from the top plate 43 symmetrically with respect to the center line perpendicular to the front plate 37. The lockpin assemblies and their mountings are disclosed in detail in Cooper and also in application Ser. No. 538,320, filed Oct. 3, 1983, to Frank W. Cooper et al. for "Sleeving of Tubes in Hostile Environments" and assigned to Westinghouse Electric Corp. Each lockpin assembly 89 includes a lockpin 91 (FIG. 5) movable upwardly into a selected tube 31, properly positioned with respect to a tube to be sleeved, and retractable downwardly by a piston (not shown) in a cylinder 93. The hydraulic fluid for moving the piston is supplied through a fitting 95 (FIG. 1). The fitting 95 is suspended from an angle bracket 97 connected to the back plate 45. The cylinder 93 is suspended from a flanged support 99 screwed into a flanged sleeve 101 secured to top plate 43 by locating pins 103 in the underside of the plate. The flanged sleeve 101 is screwed into a ring 105 appropriately positioned in the oval cavity 107 (FIG. 3) in the top plate. Two sets of locating holes for the pins 91 are provided. With the pins 91 in one set of holes, the ring 105 is seated in the upper end of the cavity with reference to FIG. 3 as shown. With the pins 91 in the other set, the ring 105 is seated in the lower end of the cavity 107 with reference to FIG. 3. The member 99 and the cylinder 93 suspended from it are locked to the sleeve 101 and the top plate 43 by a nut 109 screwed onto the member 99 and firmly engaging the flange of the sleeve 101. The holes 110 serve for engagement by a wrench to disconnect the lockpin assembly 89 from the plate 43.

The turret 25 (FIG. 1) includes a cylinder 111. Flanged end caps 113 and 115 are secured to the upper and lower ends of cylinder 111 by a plurality of uniformly spaced spring pins 117. The upper end cap has a central shouldered extension 119 in whose shoulder the upper thrust bearing 55 is secured. The lower end cap 115 has a shouldered opening in whose shoulder the lower thrust bearing 121 is secured. When the turret 25 is positioned in the apparatus, the inner race 123 of bearing 121 engages a shoulder on the lower pivot 125. A plate 127 is secured to the lower end of the lower end cap 115 engaging a shoulder depending from the lower end. The plate 127 has a spherical groove which is engaged by a ball (not shown) in a spring-activated plunger 129 extending from a screw 131 secured in the torque rim 133 of the indexing driveshaft assembly 135. The turret 25 is indexed by the plunger 129 when the torque arm 135 is rotated. Upper and lower index plates or rings 137 and 139 are bolted to the flanges 141 and 143 of the end caps 113 and 115. The bottoms of the index plates are flush with the bottoms of the flanges. A plurality of holes 145 defined by circularly cylindrical arcs are provided in the upper index plate 137. Cavities 147 defined by circularly cylindrical arcs are provided in the lower index plate 139. The cavities 147 in the lower index plate 139 face upwardly. The holes 145 and cavities 147 at each angular position of the turret are coaxial and serve as a receptacle for a sleeve blank 27. Each cavity 147 engages the lower end of a sleeve blank. Slots 149 (FIG. 2) extend through each cavity 147. Slots 150 (FIG. 1) also extend through each hole 145. The slots are penetrable by the lifting arm 151 of the lifter 29. The lifting arm 151 has a projection 153 which engages the lower end of a sleeve blank 27 in a receptacle formed of the holes 145–147. To facilitate the lifting operation, the lower end of each sleeve blank 27 is flared. The index plates 137 and 139 have holes 155 around their periphery for engagement by a handle assembly for handling the turret during installation.

Figure 6:
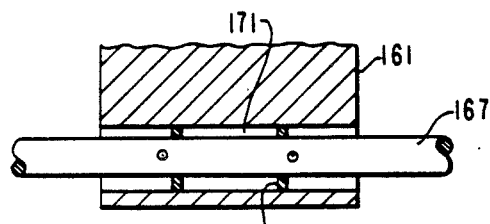
FIG. 6 is a fragmental view in longitudinal section taken in the direction VI—VI of FIG. 2.
Figure 7:
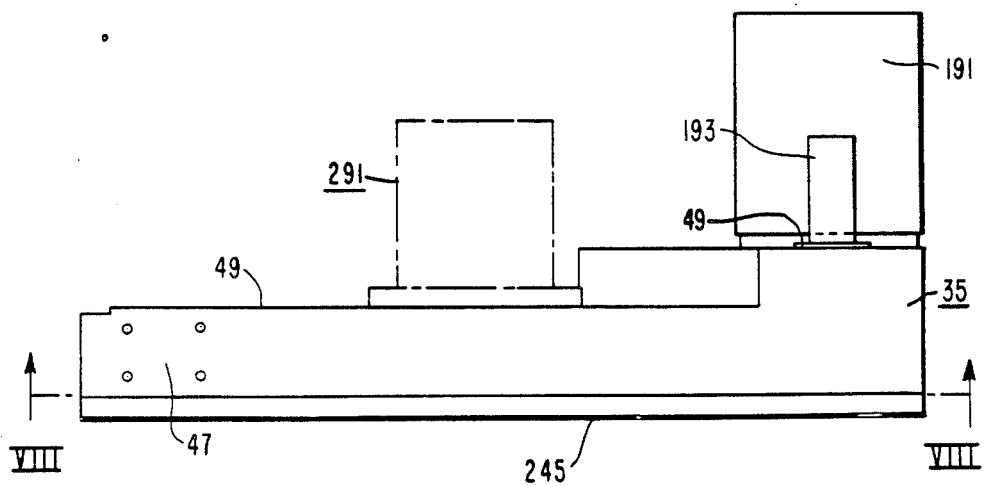
FIG. 7 is a fragmental view in side elevation showing the gear box of the apparatus shown in FIG. 1.
Figure 12:
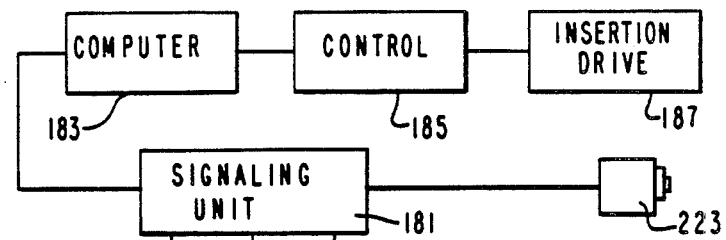
FIG. 12 is a block diagram showing the manner in which the lifter controls the turret drive.
Figure 12:
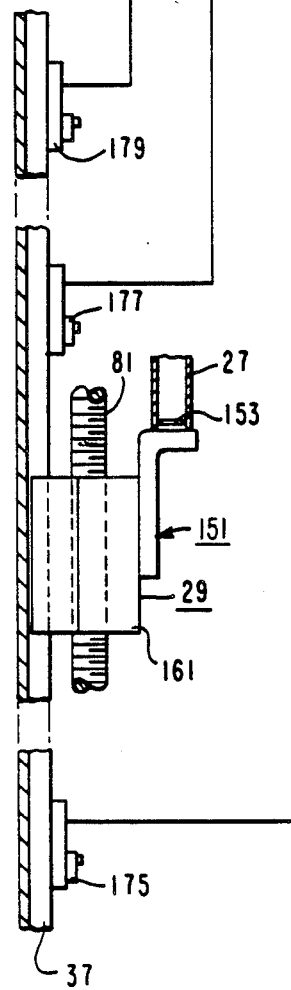

The lifter 29 includes, in addition to the drive screw 81, the bearings 79, the bearing nut 85, and the lifter arm 151, a saddle block or carriage 161 (FIGS. 1, 2). The saddle block 161 is hollow and within the saddle block a ball nut 163 is secured to a block 165 connected to the carriage. As the drive screw 81 is rotated in one direction or the other, the ball nut 163 is movable upwardly or downwardly carrying the saddle block 161 with it. The lifter arm 151 is supported from the surface of the saddle block which faces the turret 25. The lifter arm 151 is of generally L-shaped longitudinal cross section with the projection 153 on its horizontal surface. The saddle block 161 is guided by shafts, bars or rails 167. The shafts 167 extend between the upper plate 49 of the gearbox 47 and the top plate 43 of the framework 23. The shafts 167 are supported by rail supports 169 mounted on the front wall 37 of the framework 23. The saddle block 161 carries ball bushings 171 (FIG. 6) which engage and move along the shafts 167 when the saddle block moves upwardly or downwardly. Each bushing 171 is provided with a seal 173 at each end. The bushings 171 have slots so that they clear the rail supports 169 (FIG. 2) as the bushings move upwardly or downwardly with the saddle block 161. Limit switches 175, 177 and 179 (FIGS. 1, 12) mounted inwardly along the front plate 37 are actuable by the saddle block 161. When the saddle block is in the lowermost position, it actuates limit switch 175 to indicate that it is in this position. When the saddle block is in the uppermost position, it actuates limit switch 179. When the saddle block is in a position such that the sleeve blank 27 has just entered the tube 31 to be sleeved, it actuates limit switch 177. Typically, limit switches 175, 177, 179 are microswitches which are closed by engagement with the saddle block 161 and reopen automatically when disengaged.

The limit switches 175, 177, 179 are connected to a signalling unit 181 (FIG. 12) which transmits intelligence as to the position of the saddle block 161 and sleeve blank 27 which it carries to a computer 183. Through a control 185, the computer 183 sets the insertion drive 187 to operate in dependence upon the position of the saddle block. At the start of an advance of a sleeve blank, the insertion speed is low so that the sleeve blank 27 is advanced at a low speed. When limit switch 177 is actuated, indicating entry of the sleeve blank into tube 31, the speed of the insertion drive 187 is increased substantially increasing the speed of insertion. When the limit switch 179 is actuated, the insertion drive is stopped and after a short delay, reversed. When switch 177 is actuated on the retraction stroke, the speed of the insertion drive 187 is reduced. The operation at a low speed as sleeve blank enters the tube 31 and at a higher speed over the sleeve blank penetrates the tube is an important feature of this invention.

Figure 8:
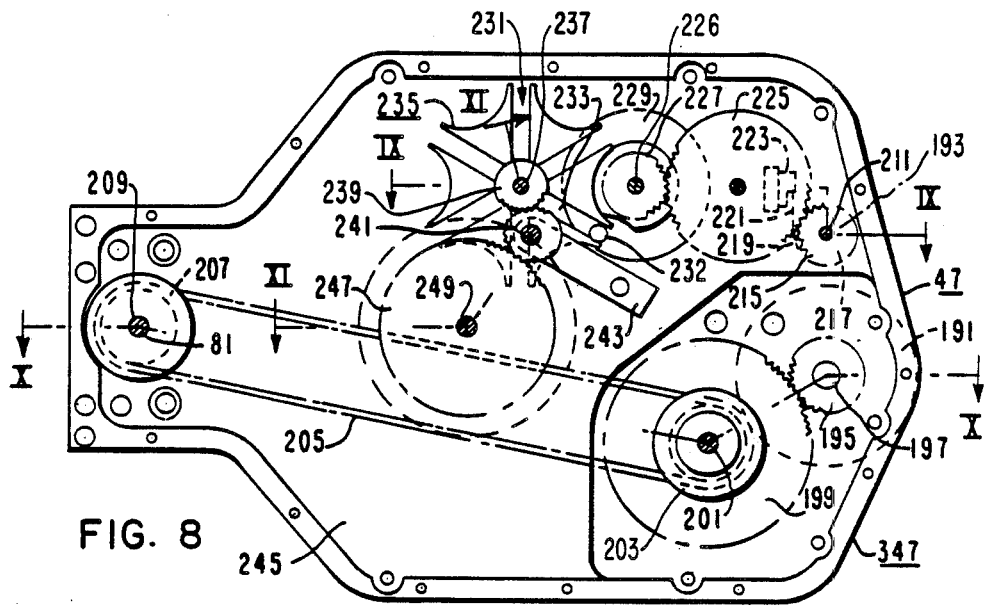
FIG. 8 is a view in transverse section taken along line VIII—VIII of FIG. 7.
Figure 9:
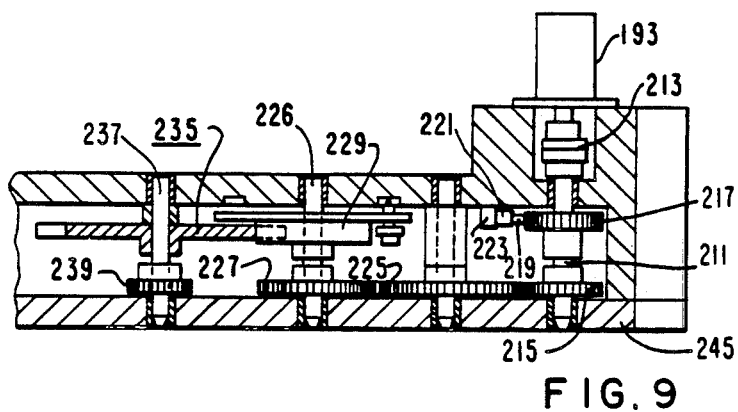
FIG. 9 is a fragmentary view in longitudinal section taken along line IX—IX of FIG. 8.
Figure 10:
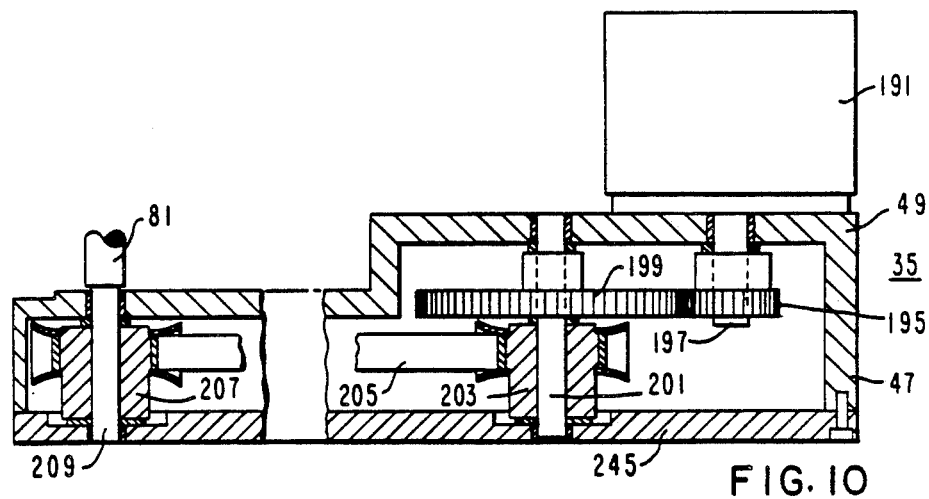
FIG. 10 is a fragmentary view in longitudinal section taken along line X—X of FIG. 8.
Figure 11:
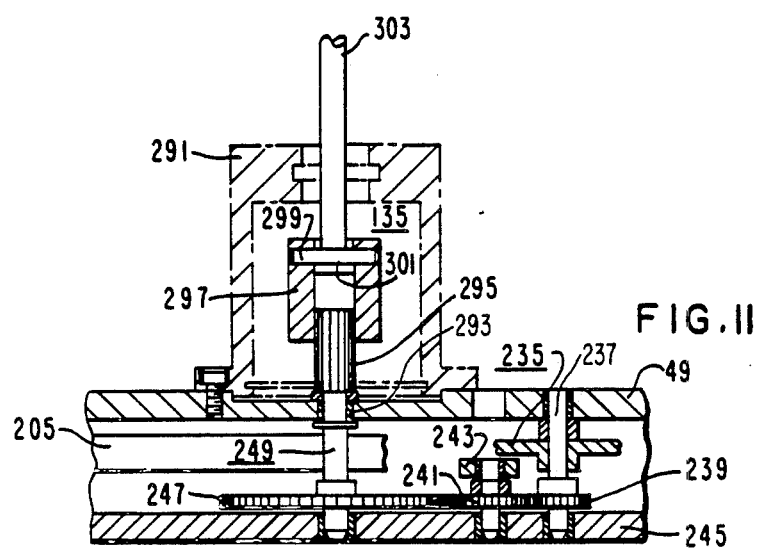
FIG. 11 is a fragmentary view in longitudinal section taken along line XI—XI of FIG. 8.

The drive 35 includes, in addition to the indexing shaft assembly 135, the torque arm 133 and the screw 131 and plunger 129, a sleeve-blank insertion motor 191 and an indexing motor 193 (FIGS. 1, 1A, 2, 7–11). The motors 191 and 193 are mounted on the top cover 49 of the gearbox 47. The sleeve-blank insertion motor 191 drives a pinion 195 through its shaft 197 (FIGS. 8, 10). The pinion 195 meshes with a speed reducing gear 199 on whose shaft 201 a sprocket sheel 203 is mounted. A timing belt 205, driven by sprocket wheel 203, drives the drive screw 81 through a sprocket wheel 207 keyed to the shaft 209 of drive screw 81. Typically, the speed of the motor 191 is varied by varying the voltage impressed on this motor. Typically, with a voltage of 20 volts impressed on the motor, the sleeve blank is advanced at a velocity of 2" per second and with 40 volts on the motor 191, the sleeve blank is advanced at 3.6" per second.

Figure 13:
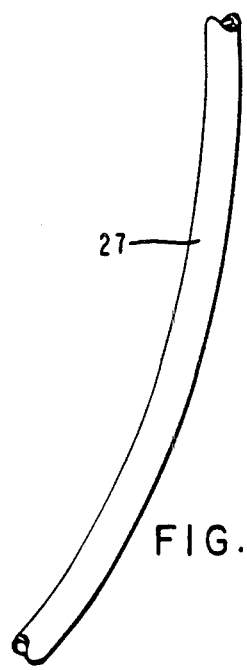
FIG. 13 is a view in side elevation of a sleeve blank used in the practice of this invention.

Typically, the sleeve blanks 27 (FIG. 13) are composed of INCONEL alloy. Typical sleeve blanks that are in use are a bimetallic sleeve blank composed of INCONEL 625 and INCONEL 690 annuli and a sleeve blank composed only of INCONEL 690 or INCONEL 600. The lengths of the sleeve blanks 27 are typically 36", 40" or 42". The cartridge sleeve-blank loader 21 in accordance with this invention does not include an expander as does Cooper's inserter (SMIT). Friction between the sleeve and the sleeved tube 31 is relied upon to hold the sleeve when the lifter is retracted. The sleeve blanks 27 are, in the practice of this invention, slightly curved or bowed as shown in FIG. 13. Typically, a bimetallic sleeve blank 40" long is bowed by $0.080 \pm 0.020''$ at the longitudinal center or at the point of maximum departure from linearity. A sleeve blank 40" long of INCONEL 690 alone is typically bowed $0.060'' \pm 0.020''$ at the longitudinal center or at the point of maximum departure from linearity. The tubes 31 which are sleeved are linear so that when a bowed sleeve blank is thrust into a tube, the tube exerts a force tending to straighten the sleeve blank. The sleeve then exerts a restoring force against the wall of the sleeved tube so that the sleeve is firmly held in the tube and does not fall out when the lift bar is retracted. To preclude damage to a sleeve blank by axial or lateral contact with the tube sheet, the sleeve blank is initially advanced towards the tube sheet by the lifter at a low speed, typically 1" to 3" per second. Once the sleeve blank enters the tube, the speed is substantially increased, typically to 4" to 6" per second.

A shaft 211 (FIG. 9) is driven by the indexing motor 193 through a multi-jaw coupling 213. The shaft 213 drives a pinion 215 and a cam 217. The cam has a flat surface over about 135° of its circumference (FIGS. 8, 9) and a cylindrical surface over the remainder of its circumference. The cam is engaged by a cam follower 219 on the switch arm 221 of a limit switch 223 suspended from the bottom of top plate 49 of the gearbox 47. When the cam follower 219 engages the flat surface, the arm 221 is pivoted counterclockwise (with reference to FIG. 8) closing the switch. When the cam follower is in the cylindrical part of the cam surface, the arm 221 is pivoted clockwise and the switch is open. The pinion 215 meshes with an idler gear 225. The idler gear 225 drives a gear 227 at the same speed of rotation as the pinion 215.

The cam 229 of the Geneva movement 231 is on the shaft 226 of gear 227. The cam 229 carries a pin 232 which, as the cam rotates, engages successively in the slots 233 of the star gear 235 of the Generva movement indexing the star gear. On the shaft 237 of the star gear 235 there is a pinion 239 which meshes with an idler gear 241. The idler gear 241 is supported on a bracket 243 secured to the base 49 of the gearbox. The idler gear 241 meshes with a speed-reducing gear 247 which drives a shaft 249. The shaft 249 drives the indexing shaft assembly 135 (FIG. 1). The train of gears 215, 225, 227, 235, 241 and 247 are such that the shaft 249 is indexed one step for each complete rotation of gear 215 and cam 217. Limit switch 223 is actuated once for each indexing step of the shaft 249 and the turret 25. Actuation of the switch 223 transmits intelligence to computer 183 that an indexing operation has been completed. The shaft 249 is centered under the insertion position of the turret 25.

The index shaft assembly 135 (FIGS. 1, 1A, 11) includes a circularly cylindrical flanged housing 291. The housing is seated on the top plate 49 of the gearbox 47 with its heel-like projection engaging a circular shoulder in the surface of top 49. The shaft 249 passes through a bearing 293 in the top 49 and terminates in a splined extension 295 which extends into the housing 291. The extension 295 is engaged by a splined bushing 297. The splined bushing 297 is connected by a pin 299 to the splined extension 301 of a shaft 303. The lower pivot 125 is secured to the top of shaft 303 by a central screw 305. The torque arm 133 is split at the end remote from the screw 131 and is clamped to the top of shaft 303 by screw 307. The assembly 135 also includes a piston 309 (FIG. 1). The shaft 303 extends through bushings 311 in a central opening in the piston 309. The upper surfaces of the bushing 297 and of the splined section 301 are flush and they abut a spacer 313 abutting the inner surface of the flange 315 of the piston 309. There are O-ring seals 317 and 319 between the stem 319 of the piston and the inner surface of the top of housing 291 and between a peripheral slot 321 in the flange 315 of piston 309 and the lower wall of the housing 291. The piston 309 is urged upwardly by a spring 323 which is compressed between a shouldered annulus 325 supported on a ring 327 secured near the bottom of the inner wall of housing 291 and the bottom surface of the piston 309. The upper turn of the spring 323 is seated in the annular space between an annular tip of the piston and the outer surface of the splined bushing 297. Under the upward force of spring 323, the piston 309 maintains the parts connected to it, including the shaft 303 and its splined section 301, the bushing 297, the torque arm 133, the plunger 129 and the lower pivot 125 in the uppermost position. The pivot 125 is urged into firm locked engagement with thrust bearing 121 securing the turret 25 in its operating position. The upward force of the spring 323 is counteracted by compressed air supplied through fitting 327 (FIG. 1), conductor 329 (FIG. 1A) and nozzle 331 to the top of the flange 315 of the piston. Fitting 327 is supported on angle bracket 97. When the compressed air is supplied, the force of spring 323 is counteracted and the piston 309 and the parts connected to it are moved downwardly disconnecting lower pivot 125 from thrust bearing 121 so that the turret 25 may be readily removed. When the compressed air is interrupted, the piston 309 and the parts connected to it snap upwardly and the pivot 125 is snapped into firm engagement with the thrust bearing 121 of a turret 25 which is positioned for operation. The indexing shaft indexes the turret through splined bushing 297, splined section 301, torque arm 133, plunger 129 and plate 127.

In the practice of this invention, a turret 25 is loaded with sleeve blanks 25 outside of the channel head and is attached to a readily removable handle assembly. The attendant now enters the channel head. By setting the valve 415 (FIG. 1) in the open position, the attendant applies compressed air to piston 315. The piston 315 and the shaft 303, the torque arm 133 and the lower pivot 125 are retracted. The unloaded turret 25 is readily removable and is removed by the attendant and given to personnel outside of the channel head. The valve 415 is left in the open setting. The personnel outside of the channel head now give the loaded turret to the attendant. With the aid f the handle the attendant now inserts the loaded turret into the sleeve blank loader. After the turret 25 is positioned in the sleeve-blank loader as just described, the attendant closes valve 415 disconnecting the compressed air. Under the action of spring 323, the lower pivot 125 is snapped into bearing 121 locking the turret firmly in the loader 21. The attendant then removes the handle assembly. The attendant now leaves the channel head and the sleeving proceeds automatically. The time spent within the channel head by the attendant in completing his task is typically about 75 seconds.

While a preferred embodiment and preferred practice of this invention have been disclosed herein, many modifications thereof are feasible. This invention is not to be restricted except insofar as may be necessitated by the spirit of the prior art.

We claim:

1. The method of sleeving a damaged tube of a steam generator of a nuclear-reactor plant, said tube being linear; said method comprising producing curvature in a sleeve blank of resilient material to be inserted as a sleeve into said tube, said curvature being so small as to permit the insertion of the blank into said tube, engaging one end of said blank and advancing said blank into said tube with the opposite end of said blank leading while applying sufficient thrust to said blank through said one end to insert said blank into said tube, notwithstanding its curvature, so that said blank forms a sleeve in said tube, as a result of the curvature in said blank the said sleeve being held firmly in said tube by the restoring forces exerted by said blank, and disengaging the lower end of said sleeve.

2. The method of sleeving a tube of a steam generator of a nuclear-reactor plant by advancing a sleeve blank from an initial position in wich the sleeve blank is spaced from said tube to a position in which said sleeve blank is fully inserted in said tube as a sleeve, the said method comprising advancing said sleeve blank at a lower speed, so as to preclude damage to the tube blank by undesirable contact with the tube sheet, until the sleeve blank enters said tube, then advancing said sleeve blank into said tube at a higher speed until said sleeve blank is fully inserted in said tube.

3. The method of claim 2 for sleeving tubes that are linear including the step of producing a curvature in the sleeve blank before advancing said sleeve blank at the low speed.

4. The method of claim 1 wherein the curvature is slight but effective to permit insertion of the blank in the tube and securing of said blank in said tube.

5. The method of claim 1 wherein the curvature in the sleeve blank is produced by bowing the sleeve blank, a sleeve blank 40 inches in length being bowed by between 0.040 inch and 0.100 inch at the pint of maximum departure.

6. The method of claim 1 wherein the sleeve blank is advanced towards the tube at a lower speed until said sleeve blank enters the tube and thereafter said sleeve blank is advanced into the tube at a substantially higher speed until it is inserted in the tube.

7. The method of sleeving a damaged tube of a steam generator of a nuclear-reactor plant with a sleeve blank to be inserted as a sleeve in said tube, said sleeve blank being composed of resilient material and being of substantial length, said tube being linear; said method comprising producing curvature in a sleeve blank, said curvature being so small as to permit insertion of said sleeve blank into said tube, engaging one end of said blank and, by applying thrust to said blank through said one end, advancing said blank into said tube at a low speed with the opposite end of said blank leading, said thrust being sufficient to insert said other end into said tube notwithstanding the curvature of said blank, after said other end of said blank has been inserted in said tube, advancing said blank into said tube at a substantially higher speed than said low speed so that said blank forms a sleeve in said tube, said sleeve being held firmly in said tube, as a result of the curvature in said blank by the restoring force exerted by said blank, and disengaging said one end of said sleeve.

* * * * *